INVENTORS
JIM SCOW and
JAMES L. JONES
BY
ATTORNEYS

INVENTORS
JIM SCOW and
JAMES L. JONES

BY
ATTORNEYS

INVENTORS
JIM SCOW and
JAMES L. JONES
BY [signature]
ATTORNEYS 3,283,088

MULTIPLE CIRCUIT SWITCH APPARATUS WITH IMPROVED PIVOT ACTUATOR STRUCTURE

Jim Scow, Hampton, Va., and James L. Jones, Santa Clara, Calif., assignors to the United States of America as represented by the National Aeronautics and Space Administration Filed Sept. 1, 1965, Ser. No. 484,489
25 Claims. (Cl. 200—6)

The invention described herein may be manufactured and used by or for the Government of the United States of America for governmental purposes without the payment of any royalties thereon or therefor.

This invention relates to electrical switches and more particularly to a switch apparatus for switching a multiplicity of circuits with relatively little hand or eye movement required on the part of the switch operator.

In the fields of modern technology situations occur where it is necessary for an operator to control a substantial number of circuits in a quick efficient manner which will present a minimum of diversion from other activities and which will require a minimum of motion to accomplish the controlling and a minimum of eye movement to observe the effects of the controlling.

For example, in the field of space travel an astronaut is often called upon to control a large number of circuits for the purpose of actuating various systems or making checks on the condition of such systems. In numerous instances the astronaut is exposed to various "G" fields at the time the circuit controlling activity must be performed. In addition the astronaut is often restrained by uniforms and harnesses which limit the amount of movement he can perform.

Accordingly it is an object of the present invention to provide a multiple circuit switch apparatus which will enable an operator to control a substantial number of circuits in a quick and efficient manner with a minimum of hand and eye motion.

Another object of the invention is to provide a multiple circuit switch which is accident proof.

A more specific object of the invention is to provide a multiple circuit switch apparatus having a movable control member with visual and or tactile sensing means for informing the operator of the position of said control member.

A further object of the invention is to provide a multiple circuit switch apparatus including an operating member movable to various positions for controlling a variety of circuits wherein an integrated observation panel is provided so that the operator can tell at a glance the position of the control member and the condition of the one or more circuits operable by said control when in said position.

By way of brief description a preferred embodiment of the invention comprises an operating lever in the form of a joy stick having a handle at one end and a switch actuating abutment adjacent the other end. The operating lever is mounted on a supporting frame for movement of the switch abutment portion in an arc in one plane and for movement transverse to said plane. A plurality of switches are positioned on each side of the plane and each switch has an operating button positioned along the arc for engagement by said abutment portion. Detent type stop means are provided for assuring positive positioning of the lever to align said abutment portion with each of said switches as it moves along said arc. The complete apparatus includes an observation panel having a pair of columns of visual indicators such as lights. The number of indicators in each column is equal in number to the number of switches on one side of said plane and are connected thereto. A third column of visual indicators is provided intermediate the first mentioned columns in order to provide visual indication of the position of said operating member. In order to actuate the center column the detent stop means are also switches so that at each position of the operating lever where it is stopped by a detent means the detent means will complete a circuit to cause actuation of the appropriate visual indicator. Thus by moving the joy stick handle the abutment portion of the operating lever can be brought into alignment selectively with each of the switches on each side of said plane. The position of the operating lever is communicated to the operator in a tactile manner from the action of the detent stop means and also visually from the center column of indicators. Then by moving the joy stick transversely of said plane the abutment portion will engage the switch on one or the other sides of said plane. And the appropriate outside column of visual indicators on the observation panel will indicate the condition of the circuit which is being thus controlled.

The various features and objects of the invention will become more apparent from the following detailed description wherein reference is made to the accompanying drawings in which.

Figures 1, 2:
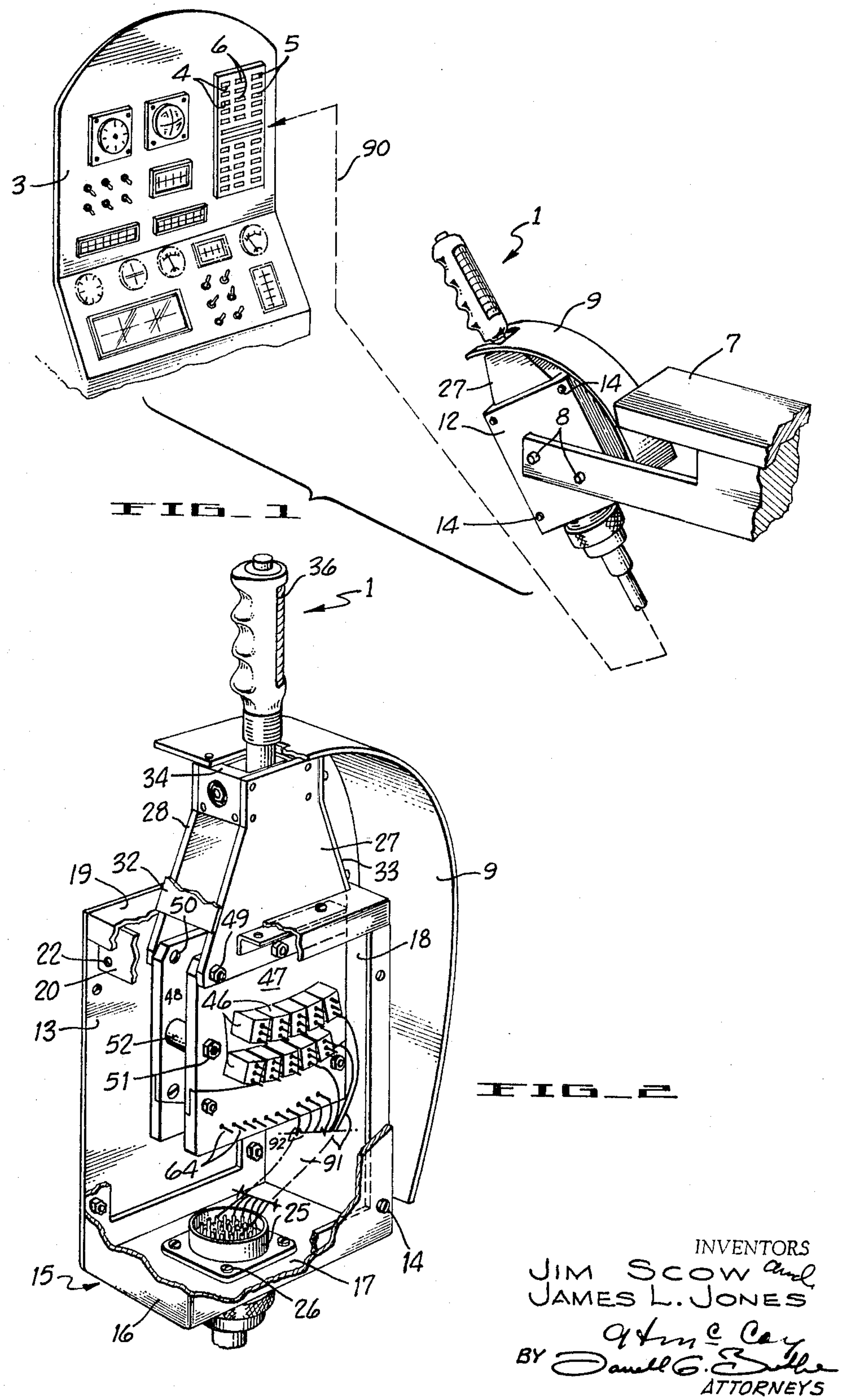
FIGURE 1 is a perspective view showing the switch apparatus integrated with the observation panel.
FIGURE 2 is a perspective view of the switch apparatus on enlarged scale and with the outer casing of the apparatus broken away.

Referring in more detail to the drawings, FIGURE 1 shows a preferred embodiment of the multiple circuit switch apparatus including a joy stick type operating member 1 and an observation panel 2. The observation panel can be conveniently mounted on a conventional control panel 3 as is found in space vehicles. The observation panel contains a first column of ten visual indicators 4, a parallel column of ten visual indicators 5 and an intermediate column of ten additional visual indicators 6. The visual indicators are operated by movement of the joy stick operating member 1 and can be of any conventional type such as light bulbs. In order to allow the operator to orient himself more quickly when viewing the observation panel it is somtimes preferable to separate the visual indicators into vertical groups. For example as shown in FIGURE 1 the visual indicators are separated slightly into an upper group of five and a lower group of five. The joy stick operating member is mounted on a support pedestal 7 in the space craft, or other environment, by means of screws 8. The operator's arm can be strapped on support pedestal 7 in a position so that his hand can grip the joy stick operating member 1. A transition strip 9 is preferably added to provide a comfortable support for the wrist region of the operator's arm.

As shown in detail in FIGURES 2–7 the joy stick operating member 1 is in the form of a lever and is mounted in a support frame or casing having side walls 12 and 13. The side walls 12 and 13 are attached by screws 14 to a generally U-shaped frame portion 15 which also provides peripheral walls 16, 17 and 18. The upper end of the casing is closed by a cap 19. Cap 19 has attached thereto at its front and rear ends a connecting bracket 20 so that the cap 19 is attached to the U-shaped frame member 15 by means of screws 21 which pass through the peripheral walls 16 and 18 and holes 22 in the connecting bracket 20. The peripheral wall 17 of the U-shaped member is apertured to receive a conventional multi-prong connector member 25 held in place by screws 26.

The cap member 19 is apertured to receive a pair of mounting webs 27 and 28. The mounting webs are attached to the cap member 19 by means of angle brackets 29 and 30 held in place by screws 31. The structure is preferably closed by cover plates 32 and 33 along the edges of the mounting webs.

The mounting webs 27 and 28 support a hollow bearing block 34 held in place by bolts 35. The bearing block supports the joy stick operating lever 1 which comprises a handle portion 36 at one end and a switch actuating abutment portion 37 adjacent the opposite end. The joy stick operating lever is supported by a pivot member 38 which is pivotally connected to the bearing block 34. The pivotal connection can for example comprise a stub bolt 39 on the pivot member surrounded by a bearing sleeve 40, all held in place by a nut 41. As viewed from above the pivot member has a U-shaped construction, and the operating member 1 which is in the form of a lever is pivotally supported within the legs of the U by means of a pivot forming bolt 42 in a bearing sleeve 43. Thus it will be seen that the operating lever 1 can be moved in an arc about the pivot bolt 42 and can also be moved transverse to the plane of the arc about the axis formed by pivot bolt 39. The movement of the operating lever about the two pivots 39 and 42 make it possible to move the circuit actuating abutment 37 along one path of travel until it is adjacent a selected switching means and then move the abutment transversely to the first path of travel to operate the selected switching means.

In a preferred embodiment of the invention the switching means are conventional micro switches 46. The micro switches are arranged on opposite sides of the plane in which the switch actuating abutment member 37 swings in an arc about the pivot bolt 42. Further, on each side of the plane the micro switches are arranged in two groups. One group being closer to the pivot bolt 42 and the other group being further away. Also the micro switches in each of the four groups are arranged in an arc along the arcuate path of travel of the abutment member 37.

The micro switches 46 are mounted on support plates 47 and 48. Support plate 47 is connected to the support web 27 by means of screws 49, and plate 48 is connected to web 28 by screws 50. Plates 47 and 48 are reinforced and held properly spaced by bolts 51 and spacing sleeves 52. The micro switches are mounted on the support plates 47 and 48 by means of the conventional threaded mounting tubes 53, threaded inner rings 54, and outer nuts 56. An operating button 55 is located in conventional manner in each of the threaded mounting tubes 53 and faces toward the joy stick operating lever on the inside of support plates 47 and 48. In accordance with conventional micro switch construction the operating buttons 55 are spring pressed toward the direction of the joy stick operating lever 1. The switches are actuated in opposite sense either by depressing the switch button or releasing it. In order to eliminate the possibility of inadvertently actuating two of the switch operating buttons with the abutment 37, the innerfaces of support plates 47 and 48 are provided with spaced linear recesses 58 arranged along radial lines eminating from the axis of pivot bolt 42. The switch operating buttons on each of the support plates 47 and 48 are then arranged so that the switch operating buttons in one arcuate group are in alternate linear recesses 58 from the switch operating buttons in the adjacent arcuate group.

It should now be obvious that the joy stick operating lever 1 can be moved about the axis of pivot bolt 42 to position the switch actuating abutment member 37 adjacent any one of the switch operating buttons 55 on support plate 47 and also on support plate 48. In the preferred embodiment shown in the drawings the switch operating buttons 55 on support plate 48 are directly opposite the switch operating buttons on support plate 47. Thus by moving the switch actuating abutment member 37 adjacent any switch operating button on either support plate 47 or 48, the switch actuating abutment member 37 can then be moved in either direction about the axis of pivot bolt 39 to selectively operate two switches. In the embodiment shown in the drawings, there are five switches in each of the arcuate groups on each of the plates 47 and 48. Thus by moving the joy stick operating lever 1 to ten positions about the axis of pivot bolt 42 and then moving it transversely in both directions about the axis of pivot bolt 39 a total of twenty switches can be operated.

In order to provide means for aligning the switch actuating abutment 37 with each of the switch buttons both tactile and visual sensing means are provided. More specifically a dielectric mounting plate 60 is attached to the supporting plate 47 by means of screws 61 and a dielectric mounting plate 62 is attached to the plate 48 by means of screws 63. Ten metal detent members 64 are mounted in each of the dielectric mounting plates 60 and 62. The detent members are arranged directly opposite each other in the two dielectric mounting plates 60 and 62, and in each dielectric mounting plate the detent members are arranged so that each detent member will be aligned radially with one of the operating buttons 55 about the axis of pivot bolt 42. Further, the detent members in each of the dielectric plates are arranged along an arcuate path about the axis of pivot bolt 42. The inner face of each of the detent members 64 has a dish shaped detent or groove on its inner face. The detent members have threaded outer ends 65 and are secured in place by nuts 66. The outer ends 65 serve as terminals as well as threaded posts for the nuts 66. The abutment means which cooperate with the detent members 64 are carried by a spacing or centering arm 69. The centering arm 69 has two elongated fingers 70 and 71 which straddle the joy stick operating lever 1 and are pivotally connected thereto by means of a pivot bolt 72. The lower end of the centering arms 69 carries a pair of dielectric bushings 73 and 74 mounted on a metallic guide sleeve 76. Inside the guide sleeve 76 a pair of metallic plungers 77 and 78 are slidably received to cooperate with the detent members 64. A coil spring 79 in the guide sleeve 76 presses the plungers 77 and 78 away from each other and toward their respective detent members.

Thus, it will be understood that as they joy stick operating lever 1 is pivoted about the axis of pivot bolt 42, the plungers 77 and 78 will enter the depressions in detent members 64 to form physical stop means for accurately and positively fixing the position of the switch actuating abutment member 37 adjacent each selective one of the switch operating buttons 55. When the plungers 77, 78 are in engagement with the detent members 64, it will be seen from FIGURE 5 that an electrical circuit is completed through the detent member 64 on one of the mounting plates 60 and 62, to the adjacent plunger, through the spring 79 and guide sleeve 76 to the opposite plunger, and thence through the detent member 64 engaged by the opposite plunger. The manner in which the electrical connection just mentioned is used to provide visual sensing means will be hereinafter described in more detail. However, it should be obvious at this point that tactile sensing means are provided by the physical force of the detent and plunger arrangement. When the joy stick operating lever 1 is moved from one position to another, the plungers 77 and 78 will move out of the detent members 64 and will slide along the inner faces of the dielectric mounting plates 60 and 62. Not only does the centering arm 69 carry the plunger arrangement for providing positive stops for the movement of the joy stick operating lever about the axis of pivot bolt 42, but the centering arm also serves to urge the operating lever toward a centered hands-off position about the axis of pivot bolt 39. In more detail the operating lever is provided with a mounting post 81 brazed or otherwise secured therein. A pair of centering springs 82 and 83 are mounted on the post 81 on opposite sides of the operating lever and are held in position by means of washers 84 and nuts 85. Larger washers 86 contact the inner ends of the springs 82 and 83, and abut the fingers 70 and 71 of the centering arm 69. Thus, as shown best in FIGURE 7, when the operating lever is moved about the axis of pivot bolt 39 to depress one of the switch buttons 55, the lever 1 and arm 69 will pivot relative to each other about pivot bolt 72 to compress one or the other of springs 82 and 83, which will return the operating lever 1 to a centered position when the hand force is removed from the operating lever.

Figure 3:
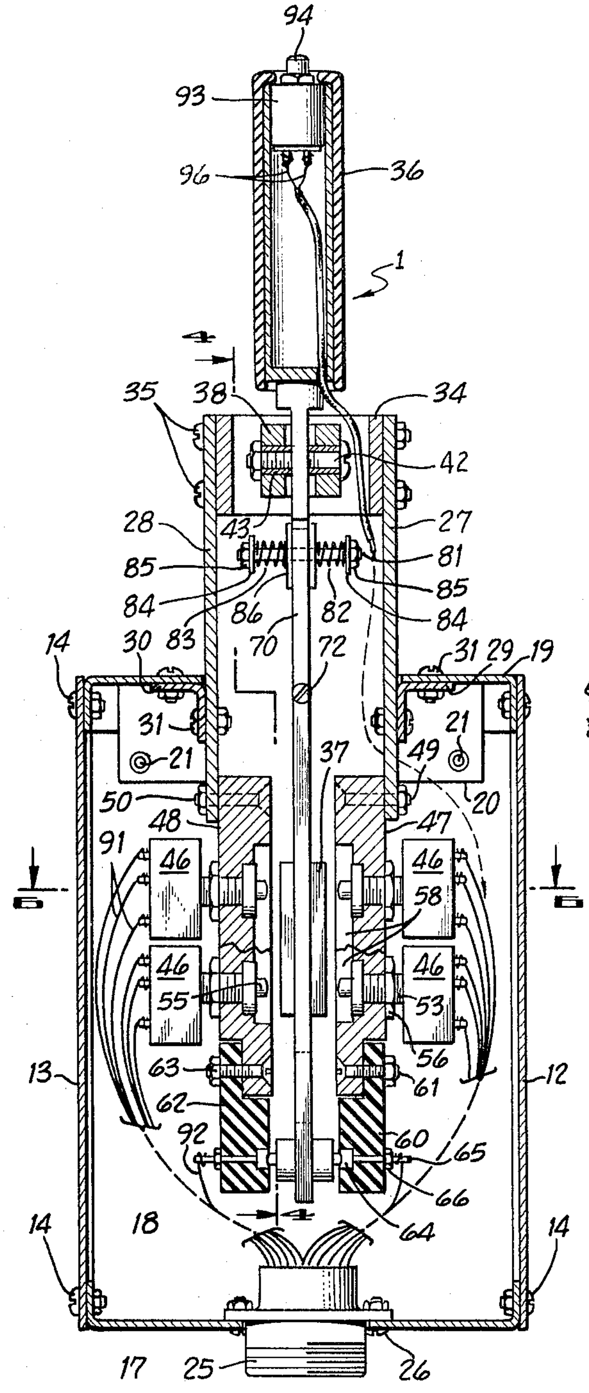
FIGURE 3 is a cross sectional view of the apparatus on a line substantially through the operating lever.
Figure 4:
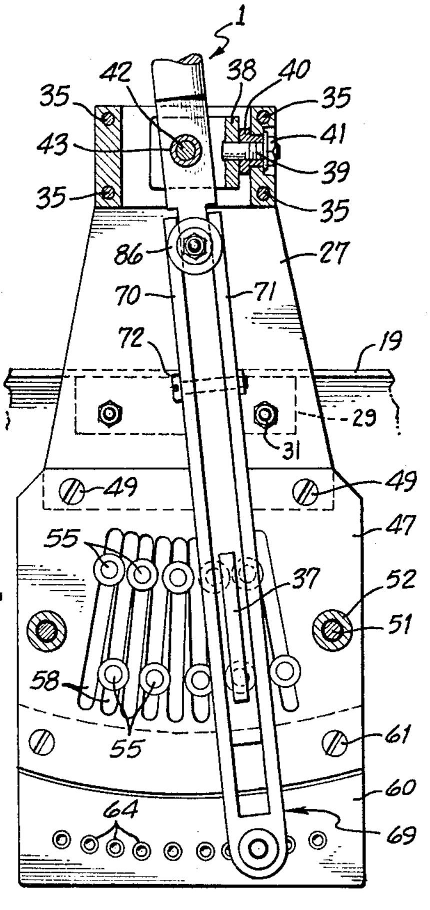
FIGURE 4 is a cross sectional view of a portion of the apparatus taken on the line 4—4 of FIGURE 3.
Figure 5:
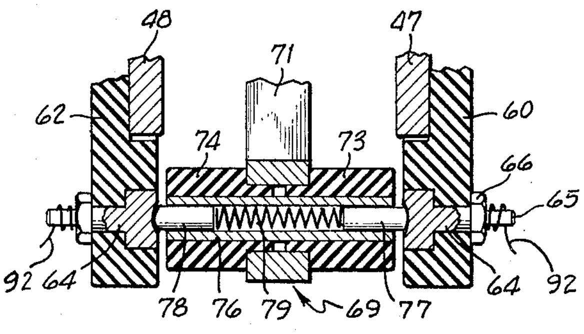
FIGURE 5 is a cross sectional view on enlarged scale showing details of the detent stop means.
Figure 6:
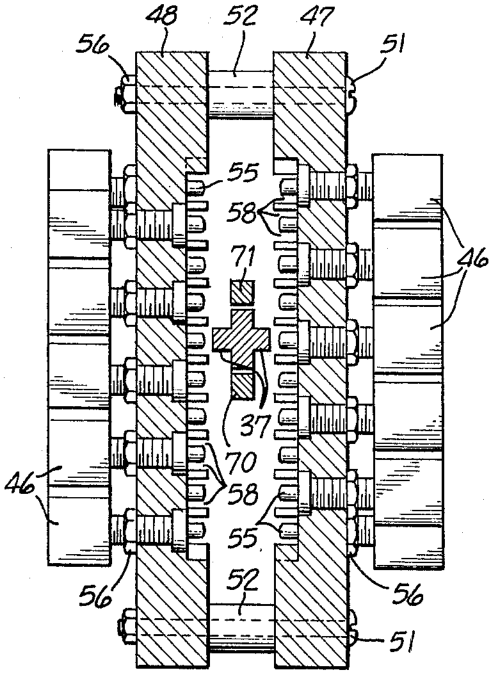
FIGURE 6 is a cross sectional view on enlarged scale taken on the line 6—6 of FIGURE 3.
Figure 7:
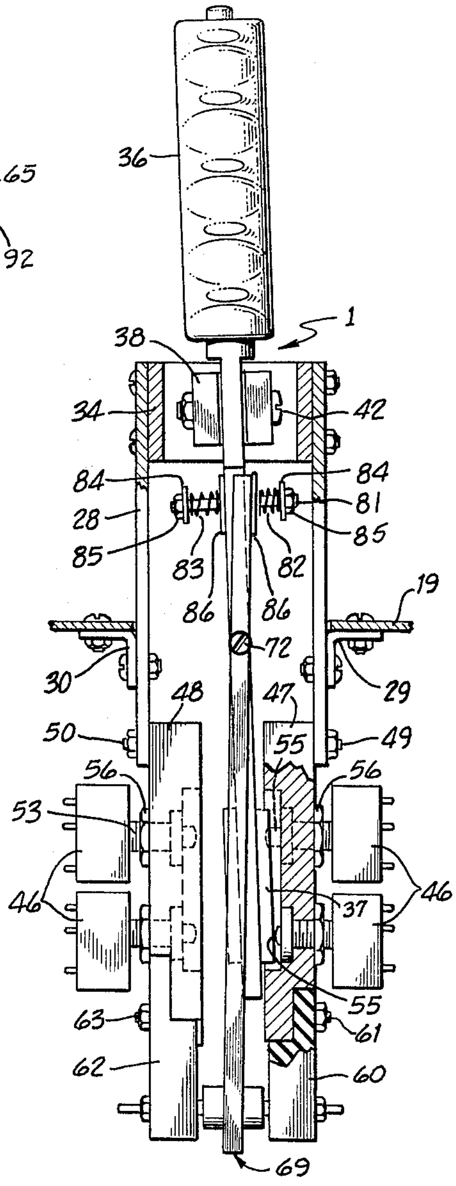
FIGURE 7 is a partial view similar to FIGURE 3 but showing the operating lever in a position in which it is moved to actuate one of the switches.

In order to provide an integrated unit, the various switches which are operated by lever 1 are connected to the observation panel 2 as indicated by the dash line 90 in FIGURE 1. Any suitable conventional circuit connections can be employed for connecting the micro switches 46 in their various circuits. For example, conventional lead lines 91 are shown in FIGURES 1 and 3 connecting the various terminals on the micro switches to the various prongs in the connector 25. Similarly, lead lines 92 connect the detent members 64 to prongs in the connector 25. A preferred arrangement for providing the desired visual integration is to connect the detent members so that one of the intermediate lights 6 on the observation panel is illuminated whenever the joy stick operating lever 1 is positioned so that the plungers 77 and 78 engage one of the detent member positions. Further, it is desirable to start with one end of the travel of lever 1 and coordinate it with one end of the columns of lights 4, 5 and 6. For example, as viewed in FIGURE 1 it is desirable to connect the detent members to the lights 6 so that when the lever 1 is all the way in its rearward position the top light 6 would be illuminated; when the lever is moved forward to the next detent position the next lower light 6 is illuminated, and so on until when the lever 1 is in its most forward position the bottom light 6 would be illuminated. Similarly, the micro switches would be connected in their circuits through the lights 4 and 5 on the observation panel. Thus the micro switches on the left side as viewed in FIGURE 1 would be connected to the lights 4 and the micro switches on the right side would be connected to the lights 5. Further, the preferred circuit connection is such that when the operating lever 1 is positioned so that the uppermost light 6 is activated, the uppermost light 4 would be activated if the lever were depressed to the left in FIGURE 1, and the uppermost light 5 would be activated if the lever were moved to the right in FIGURE 1; and so on down the columns of lights until when the lever is positioned so that the lowermost light 6 is activated the lowermost light 4 would be activated by movement of lever 1 to the left and the lowermost light 5 is activated when the operating lever is moved to the right. Thus the operator can tell at a glance where the operating lever is positioned merely by observing the position of the lighted bulb in the column 6, and he can tell at a glance the condition of the circuit he is controlling by observing the condition of the light 4 or 5 when he deflects the handle left or right. A variety of circuit arrangements are of course possible. For example, the lights 4 and 5 can be arranged so that they will go on if the circuit is correctly operating at the time the operating lever 1 is moved to actuate switch button 55 in the circuit for the particular light under consideration.

In order to avoid any possibility of inadvertent actuation of the switch apparatus, a conventional on-off switch

93 is mounted in the handle 36 with its operating button 94 projecting from the end of the handle. Switch 93 can be connected by leads 96 into the overall circuitry in such manner that no micro-switch 46 will be operated even if its switch button 55 is depressed unless the switch button 94 is simultaneously depressed.

Although specific details of the present invention are shown and described herein, it is to be understood that modifications may be made therein without departing from the spirit and scope of the invention as set forth in the appended claims.

What is claimed is:

1. A multiple circuit switch apparatus comprising a support frame, an operating lever having a handle and circuit actuating means, said operating lever being pivotally supported on said frame for movement of said circuit actuating means along an arc in a given plane, a plurality of circuit switching means on said support frame and spaced apart along said arc, means for moving said operating lever and circuit actuating means transverse to said plane to cause operative engagement between said circuit actuating means and said switching means, and said switching means being spaced transversely from said plane and being out of operative engagement by said actuating means when said actuating means is in said plane.

2. A multiple circuit switch apparatus as claimed in claim 1 in combination with an observation panel having a plurality of closely adjacent visual indicators each connected to one of said switching means.

3. A multiple circuit switch apparatus as claimed in claim 1 in which said circuit switching means are positioned on both sides of said plane.

4. A multiple circuit switch apparatus as claimed in claim 3 in which the circuit switching means on one side of the plane are directly opposite the circuit switching means on the other side of the plane.

5. A multiple circuit switch apparatus as claimed in claim 4 in which said circuit switching means on one side of the plane are arranged in plural rows spaced along said operating lever.

6. A multiple circuit switch apparatus as claimed in claim 5 in which the switch means in one of said spaced rows are angularly offset from the switching means in the adjacent row measured about the pivot axis of said operating lever.

7. A multiple circuit switch apparatus as claimed in claim 6 further comprising stop means for accurately aligning said circuit actuating means with each of said circuit switching means.

8. A multiple circuit switch apparatus as claimed in claim 7 in which said stop means are also circuit switching means.

9. A multiple circuit switch apparatus as claimed in claim 8 further comprising an on-off switch in said handle and having an operating button protruding from the end of the handle.

10. A multiple circuit switch apparatus comprising a support frame, a pivot member pivotally mounted on said frame for movement about a first axis, an operating lever having a handle at one end and a switch actuating abutment portion spaced from the handle, said lever being pivotally mounted on said pivot member for movement about a second axis normal to said first axis, said lever being movable in a substantially long arc about one of said axes, a plurality of switches each having an operating button positioned along said arc, a spacing arm pivotally connected to said operating lever for movement about a third axis normal to the axis of said arc, detent stop means having cooperating parts on said frame and on said spacing arm spaced from said third pivot axis, spring means for maintaining said operating lever and spacing arm in a fixed relation about said third pivot axis, said stop means and said switch buttons being so arranged that when said operating lever is positioned by said stop means said switch actuating abutment is aligned with one of said switch operating buttons, and said operating lever and spacing arm being so arranged that when they are held in said fixed relation by said spring means said switch actuating abutment portion is spaced from any of said switch buttons with which it may be aligned.

11. A multiple circuit switch apparatus as claimed in claim 10 in combination with an observation panel having a plurality of closely adjacent visual indicators each connected to one of said switching means.

12. A multiple circuit switch apparatus as claimed in claim 10 in which said switches are positioned on both sides of said arc.

13. A multiple circuit switch apparatus as claimed in claim 10 in which said switches are positioned on both sides of said arc, and the switch buttons on one side are directly opposite the switch buttons on the other side.

14. A multiple circuit switch apparatus as claimed in claim 10 in which said switches are arranged in plural rows spaced along said operating lever on the same side of the lever.

15. A multiple circuit switch apparatus as claimed in claim 10 in which said switches are arranged in plural rows spaced along said operating lever on the same side of the lever, and the operating buttons of the switches in one of said rows are angularly offset from the operating buttons of the switches in the adjacent row measured about the axis of said arc.

16. A multiple circuit switch apparatus as claimed in claim 10 further comprising an on-off switch in said handle and having an operating button protruding from the end of the handle.

17. A multiple circuit switch apparatus as claimed in claim 10 further comprising stop means for accurately aligning said switch actuating abutment portion with each of said switch operating buttons.

18. A multiple circuit switch apparatus as claimed in claim 17 in which said stop means are also circuit switching means.

19. A multiple circuit switch apparatus comprising a support frame, an operating lever having a handle at one end and a switch actuating abutment portion spaced from the handle, means supporting said lever on said frame for movement of said abutment portion in an arc in one plane and for movement transverse to said plane, a plurality of switches on said support frame on opposite sides of said plane and each of said switches having an operating button positioned along the arc, and said switches being so positioned that when said abutment portion is in said plane the abutment portion is out of operating engagement with said switch buttons and when said abutment portion is moved transversely of said plane said abutment portion is operatively engageable with said switch buttons.

20. A multiple circuit switch apparatus as claimed in claim 19 further having stop means comprising metallic depression members spaced in an arc along each side of said operating lever and insulated from each other, a metallic abutment member carried by said operating lever on opposite sides thereof, a metallic spring between said abutment members and pressing them toward engagement with said depression members.

21. A multiple circuit switch apparatus as claimed in claim 20 wherein said abutment members are carried by a centering arm pivotally connected to said operating lever on an axis transverse to said one plane, a post through said lever normal to said axis, a spring on said post on each side of said lever and engaging an abutment on its respective outer end of the post, a washer around said post on each side of said lever, the inner end of each spring being in abutment with its respective washer, and said washers being in abutment with both said lever and said centering arm when said lever is centered between said switch buttons on opposite sides of the lever.

22. A multiple circuit switch apparatus comprising a support frame, an operating member having a handle and circuit actuating means, means connecting said operating member to said support frame for moving said actuating means along a path, a group of circuit switching means positioned on said support frame along said path, and means for moving said operating member transverse to said path to cause said actuating means to actuate said switching means.

23. A multiple circuit switch apparatus as claimed in claim 22 further comprising circuit connecting means which are individually and automatically actuated by positioning said operating member so that the circuit actuating means is adjacent one of said switching means.

24. A multiple circuit switch apparatus as claimed in claim 23 further comprising an observation panel having a fist column of visual indicators equal in number to said switching means and connected thereto, and a second column of visual indicators parallel to and adjacent said first column, the visual indicators in said second column being equal in number to said circuit connecting means and connected thereto so that it will be visually apparent that said actuating means is adjacent a specific one of said switching means.

25. A multiple circuit switch apparatus as claimed in claim 24 in which the switching means in said group are all on the same side of said path, a second group of circuit switching means on the other side of said path with the switching means of each group arranged directly opposite each other so that when said actuating means is adjacent one of the switching means in one group it will also be adjacent one of the switching means in the other group, and a third column of visual indicators on said panel parallel to and adjacent the other two columns, the indicators in said third column being equal in number to the switching means in said second group and connected thereto.

References Cited by the Examiner

UNITED STATES PATENTS

| | | | |
|---|---|---|---|
| 1,072,426 | 9/1913 | Claflin | 200—11 X |
| 2,774,926 | 12/1956 | Gilman et al. | 200—18 |
| 2,851,545 | 9/1958 | Mekelburg | 200—50 X |
| 2,924,680 | 2/1960 | Swenson | 200—12 X |

References Cited by the Applicant

UNITED STATES PATENTS

| | | |
|---|---|---|
| 2,661,402 | 12/1953 | Balch. |
| 3,022,878 | 2/1962 | Seibel et al. |
| 3,142,227 | 7/1964 | Stringer. |

ROBERT K. SCHAEFER, *Primary Examiner.*

KATHLEEN H. CLAFFY, *Examiner.*

J. R. SCOTT, *Assistant Examiner.*